US011431728B2

(12) United States Patent
Gaál et al.

(10) Patent No.: US 11,431,728 B2
(45) Date of Patent: Aug. 30, 2022

(54) METHOD AND MANAGEMENT NODE IN A COMMUNICATION NETWORK, FOR SUPPORTING MANAGEMENT OF NETWORK NODES BASED ON LLDP MESSAGES

(71) Applicant: Telefonaktiebolaget LM Ericsson (publ), Stockholm (SE)

(72) Inventors: Géza Gaál, Budapest (HU); Balázs Varga, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 251 days.

(21) Appl. No.: 16/768,002

(22) PCT Filed: Dec. 19, 2017

(86) PCT No.: PCT/SE2017/051295
§ 371 (c)(1),
(2) Date: May 28, 2020

(87) PCT Pub. No.: WO2019/125239
PCT Pub. Date: Jun. 27, 2019

(65) Prior Publication Data
US 2020/0366686 A1 Nov. 19, 2020

(51) Int. Cl.
*H04L 29/12* (2006.01)
*H04L 29/06* (2006.01)
(Continued)

(52) U.S. Cl.
CPC ........... *H04L 63/123* (2013.01); *H04L 41/12* (2013.01); *H04L 45/26* (2013.01);
(Continued)

(58) Field of Classification Search
None
See application file for complete search history.

(56) References Cited

U.S. PATENT DOCUMENTS 6,636,499 B1 * 10/2003 Dowling .............. H04L 12/4625
370/388
9,917,845 B2 * 3/2018 Wang .................... H04L 47/286
(Continued)

FOREIGN PATENT DOCUMENTS

CN 103441983 A 12/2013
CN 111343021 A * 6/2020
(Continued)

OTHER PUBLICATIONS

A Dynamic Topology Discovery Methord for Smart Substation Networks. Yang. CICED. (Year: 2014).*
(Continued)

*Primary Examiner* — Venkat Perungavoor
(74) *Attorney, Agent, or Firm* — Nicholson De Vos Webster & Elliott LLP

(57) ABSTRACT

Management of network nodes comprised in a communication network. A management node receives, from at least some of said network nodes, LLDP information based on one or more LLDP messages received from neighboring network nodes that are neighbouring said at least some network nodes. The LLDP information comprises security status information regarding said neighbouring network nodes, indicating if a neighbouring network node has been verified to be authentic and indicates if the neighbouring network node has been verified to be not authentic.

20 Claims, 6 Drawing Sheets

(51) Int. Cl.
*H04L 9/40* (2022.01)
*H04L 41/12* (2022.01)
*H04L 45/00* (2022.01)
*H04L 9/32* (2006.01)
*H04L 29/04* (2006.01)

(52) U.S. Cl.
CPC ...... *H04L 63/0428* (2013.01); *H04L 63/0876* (2013.01); *H04L 9/3247* (2013.01); *H04L 9/3263* (2013.01)

(56) References Cited

U.S. PATENT DOCUMENTS

| | | | |
|---|---|---|---|
| 10,567,230 B1* | 2/2020 | Song | H04L 41/12 |
| 11,272,042 B2* | 3/2022 | Khan | H04L 49/254 |
| 2008/0141359 A1* | 6/2008 | Lee | H04L 63/0227 726/13 |
| 2016/0014142 A1* | 1/2016 | Wang | H04L 47/286 726/4 |
| 2016/0277239 A1* | 9/2016 | Qu | H04L 61/6022 |
| 2019/0132261 A1* | 5/2019 | Vashisht | H04L 41/0663 |

FOREIGN PATENT DOCUMENTS

| | | |
|---|---|---|
| EP | 2237587 A1 | 10/2010 |
| EP | 2955874 A2 | 12/2015 |
| WO | 2017000858 A1 | 1/2017 |

OTHER PUBLICATIONS

A Multipath Transmission Scheme for the Improvement of Throughput over SDN. Chiang. IEEE. (Year: 2017).*

Performance Impact of Topology Poisoning Attack in SDN and its Countermeasure. Kaur. ACM. (Year: 2017).*

A Convergence Time Optimization Paradigm for OSPF based Networks Through SDN SPF Protocol Computer Communications and Networks (CCN)/Delay Tolerant Networks. Khan. ACM. (Year: 2017).*

International Search Report and Written Opinion for International Application No. PCT/SE2017/051295, dated Oct. 3, 2018, 11 pages.

IEEE Standard for Local and metropolitan area networks, Station and Media Access Control Connectivity Discovery,IEEE Std 802.1AB 2009, Sep. 17, 2009, 204 pages, IEEE.

IEEE Standard for Local and metropolitan area networks, Media Access Control (MAC) Security, IEEE Std 802.1AE 2006, Aug. 18, 2006, 154 pages, IEEE.

IEEE Standard for Local and metropolitan area networks, Port-Based Network Access Control, IEEE Std 802.1X 2010, Feb. 5, 2010, 222 pages, IEEE.

Khan et al., "Topology Discovery in Software Defined Networks: Threats, Taxonomy, and State-of-the-Art", IEEE Communications Surveys & Tutorials, vol. 19, No. 1, First Quarter 2017, 2016, pp. 303-324.

Medved et al., "Topology API Use Cases; draft-amante-i2rs-topology-use-cases-01", Internet Engineering Task Force, IETF, Oct. 20, 2013, pp. 1-20.

Nguyen et al., "Analysis of link discovery service attacks in SDN controller", 2017 International Conference on Information Networking (ICOIN), IEEE, Jan. 11, 2017, pp. 259-261.

Supplementary European Search Report and Search Opinion, EP App. No. 17935592.0, dated Jun 10, 2021, 9 pages.

International Preliminary Report on Patentability for International Application No. PCT/SE2017/051295, dated Jul. 2, 2020, 8 pages.

* cited by examiner

METHOD AND MANAGEMENT NODE IN A COMMUNICATION NETWORK, FOR SUPPORTING MANAGEMENT OF NETWORK NODES BASED ON LLDP MESSAGES

CROSS-REFERENCE TO RELATED APPLICATIONS

This application is a National stage of International Application No. PCT/SE2017/051295, filed Dec. 19, 2017, which is hereby incorporated by reference.

TECHNICAL FIELD

Embodiments herein relate to a method and a management node in a communication network, for supporting management of network nodes comprised in the communication network based on Link Layer Discovery Protocol (LLDP) messages.

BACKGROUND

LLDP is e.g. used to provide unidirectional, unauthenticated and unsecured topology discovery in the Ethernet layer, see IEEE 802.1AB e.g. draft 13. Today, LLDP over Ethernet networks are often used during fault management for topology discovery and validation. Received LLDP information is not verified by any security mechanism of the network elements receiving it. However, sometimes it is motivated to secure LLDP communication. For example, in Software Defined Networks (SDNs), LLDP may be a primary source behind the SDN physical topology database that is used by several applications. Many SDN applications are based on such topology discovery of network infrastructure. The primary information source of the physical layer connectivity of an SDN topology database is gathered from LLDP messages, typically by some kind of management node, e.g. SDN controller (SDNc). Validation and verification by security mechanisms is therefore desirable or even essential in some situations, e.g. in order to accomplish a topology information database that can be trusted.

There are two currently available solutions at the Ethernet layer to provide security: (i) the MACSec (802.1AE approved Jun. 8, 2006) protocol that provides data confidentiality and integrity and (ii) the Port Based Authentication (802.1X e.g. published as 802.1X-2004) protocol that provides an authentication mechanism to connected devices. These protocols work on a per port level, so they are applied to all traffic crossing that port.

SUMMARY

In view of the situation indicated above, an object is to provide one or more improvements regarding how network nodes in a communication network can be managed based on Link Layer Discovery Protocol (LLDP) messages.

According to a first aspect of embodiments herein, the object is achieved by a method, performed by a management node, for supporting management of network nodes comprised in a communication network. The management node receives, from at least some of said network nodes, LLDP information. The LLDP information is information obtained by said nodes based on one or more LLDP messages received from neighboring network nodes that are neighbouring said at least some network nodes. The LLDP information comprises security status information regarding said neighbouring network nodes. The security status information regarding a neighbouring network node indicates if the neighbouring network node has been verified to be authentic and indicates if the neighbouring network node has been verified to be not authentic.

According to a second aspect of embodiments herein, the object is achieved by a computer program comprising instructions that when executed by a processing circuit causes the management node to perform the method according to the first aspect.

According to a third aspect of embodiments herein, the object is achieved by a carrier comprising the computer program according to the second aspect, wherein the carrier is one of an electronic signal, optical signal, radio signal or computer readable storage medium.

According to a fourth aspect of embodiments herein, the object is achieved by a management node for supporting management of network nodes comprised in a communication network. The management node is configured to receive, from at least some of said network nodes, LLDP information. The LLDP information is information obtained by said nodes based on one or more LLDP messages received from neighboring network nodes that are neighbouring said at least some network nodes. The LLDP information comprises security status information regarding said neighbouring network nodes. The security status information regarding a neighbouring network node indicates if the neighbouring network node has been verified to be authentic and indicates if the neighbouring network node has been verified to be not authentic.

The security status information received with LLDP information, e.g. in MIBs, from the network nodes thus indicates which neighbouring network nodes to said network nodes that have been verified to be authentic and/or which that have been verified to be not authentic. This enables the management node to take into account whether network nodes, e.g. discovered via a discovery procedure based on LLDP messages, are authenticated and/or which are not. This in turn provides improved security in the communication network and an improvement regarding how network nodes can be managed based on LLDP messages in the communication network. Conventionally, management based on LLDP messages are based on MIBs compiled based on information from LLDP messages, but there is no security status information involved as in embodiments herein.

Embodiments herein are advantageously used together with certain other solutions disclosed herein that are based on security related information in the LLDP messages, which security related information enables to verify the authenticity of the node transmitting the LLDP message.

BRIEF DESCRIPTION OF THE DRAWINGS

Examples of embodiments herein are described in more detail with reference to the appended schematic drawings, which are briefly described in the following.

DETAILED DESCRIPTION

As part of the development towards embodiments herein, the situation indicated in the Background will first be further elaborated upon.

While the existing "per port" protocols mentioned in the Background can be used to accomplish desired security regarding e.g. authentication and message integrity, they will in some situations result in undesired side effects, e.g. unnecessary processing and overhead and thereby unnecessary energy consumption and/or reduced performance. Reduced performance is here both regarding additional computation needed and additional delay caused by the additional computation. Such situation may e.g. occur when the communication network is part of a Radio Access Network (RAN) that in turn may be comprised in a New Radio (NR), also referred to as 5G, wireless communication network, designed to be based on Software Defined Networking (SDN) and to be energy and performance efficient. In such network there is also already encryption provided by higher layers and therefore encryption per port on lower layers result in partly unnecessary security being added to the cost of reduced performance and/or increased energy consumption.

More specifically, LLDP is lacking any security mechanism so without any deep technology knowledge an MiTM (Man in The Middle) attacker or an end-point device may:

Send malicious information

Receive topology specific information

Initiate Denial of Service (DoS) attacks over LLDP

Further, LLDP is a relatively slow protocol with a limited size of Management Information Database (MIB) database/storage and a MIB can be overutilized from a single client with forged messages.

A purpose with LLDP security may therefore to be able to authenticate neighbour node(s) and/or check the integrity of LLDP messages and/or provide encryption of LLDP messages/content.

MACSec as mentioned in the Background encrypts all traffic on a port and requires hardware support to ensure line-rate encryption. 802.1X provides port base authentication, which is affecting the whole port operation. It requires maintaining an authentication architecture, e.g. a Remote Authentication Dial In User Service (RADIUS) server, certificate allocation systems, etc.

As already mentioned, LLDP is a "slow protocol" where bandwidth required is minimal and the frame transmission rate is limited to a maximum of 10 frames per second. Therefore, using MACSec/802.1X is overkill just for the purpose of LLDP security and would impact all other traffic sent over a given port.

Further, the existing LLDP protocol sends the messages in unencrypted format, i.e. in cleartext.

Based on the above it has been identified a need when LLDP messages are used to provide improvements regarding security, e.g. node authentication and/or message integrity, and also to provide improvements regarding how network nodes in a communication network can be managed based on LLDP messages.

Figure 1:
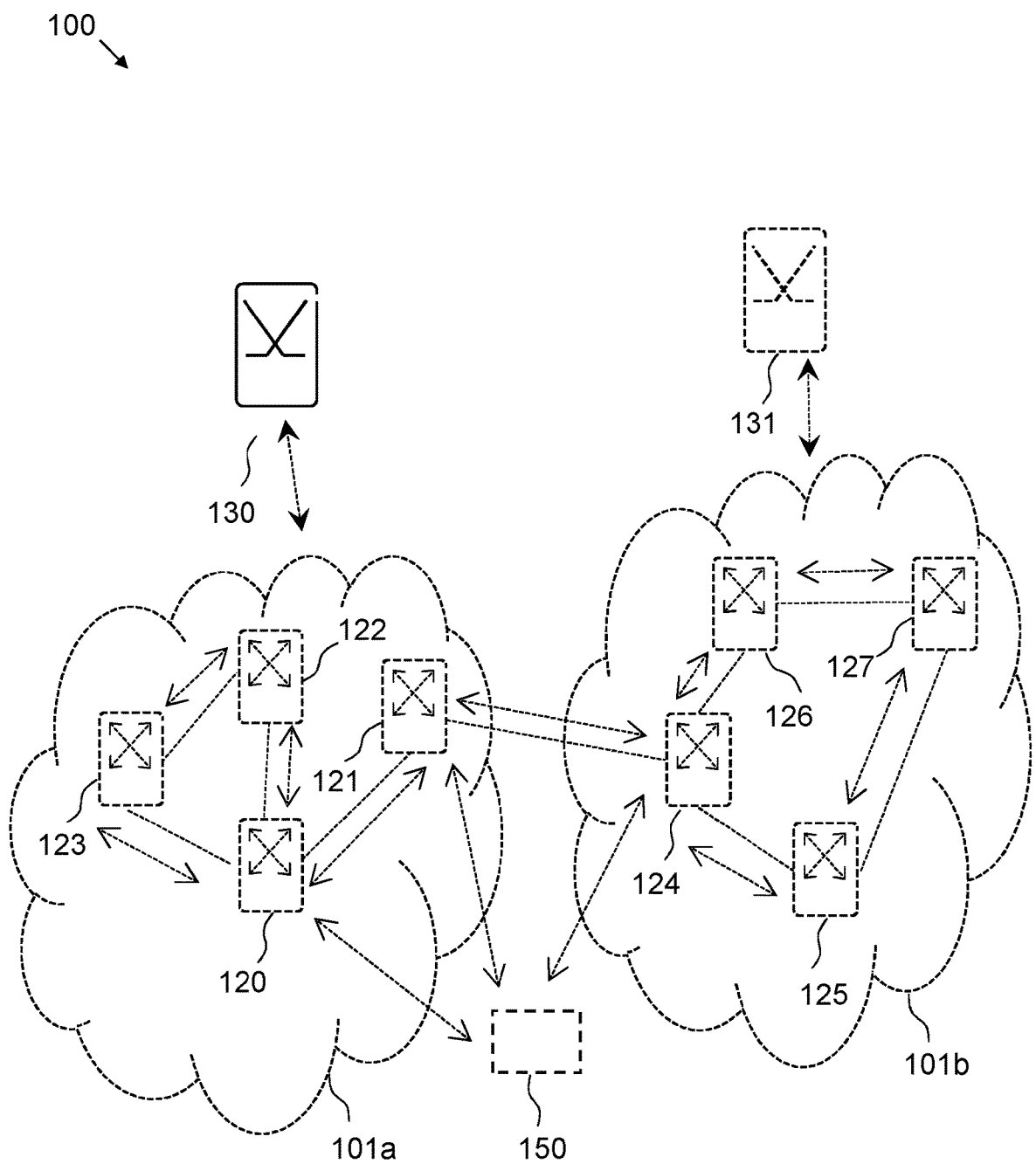
FIG. 1 is a block diagram schematically depicting an example of a communication network in which embodiments herein may be implemented.

FIG. 1 schematically depicts an example of a communication network 100 in which embodiments herein may be implemented. Features that may be present in only some embodiments are typically drawn with dotted lines. The communication network 100 may e.g. be or comprise a RAN and/or be part of a NR or 5G wireless communication network. Another example of the communication network 100 is a network that is part of and/or controlled by a data center. The communication network 100 typically comprises a transport network or Ethernet network. The communication network 100 further comprises one or more network nodes that are transmitting and/or receiving nodes 120-127. These nodes may be directly or indirectly interconnected. Note that while some network nodes 120-127 in the following may be named only transmitting node or receiving node, this naming has typically been selected just for exemplifying purposes, e.g. for facilitating understanding of an example where transmitting capabilities of the network node is in focus. However, in practise a network node that is named a transmitting node typically also has receiving capabilities, and vice versa. For example, an Ethernet switch, being a transmitting node, e.g. the transmitting node 120, may at the same time also be a receiving node regarding other messages transmitted to the transmitting node 120, e.g. from another network node, e.g. from the network node 123.

The transmitting and/or receiving nodes 120-127 may e.g. be physical or virtual nodes, where the latter e.g. may be the case when the communication network 100 is associated with a data center.

Each of the transmitting and/or receiving nodes 120-127 has one or more neighbours, i.e. neighbouring nodes they are directly connected to. Neighbouring nodes, such as the transmitting node 120 and the receiving node 121, may communicate directly with each other without doing so via one or more intermediate nodes.

The transmitting and/or receiving nodes 120-127 may, as shown in the figure, belong to different network domains, e.g. the transmitting and/or receiving nodes 120-123 may be comprised in a first network domain 101a while the transmitting and/or receiving nodes 124-127 may be comprised in a second network domain 101b. Networks domains may distinguish from each other by some network separation and/or isolation, and e.g. correspond to different subnetworks. They may differ in purpose, management, control and/or administration, e.g. there may be different administration entities involved. Different network domains may e.g. be administrated by different organization. Typically, different network domains also means different security domains. One network domain, e.g. 101a may contain radio nodes, e.g. of a RAN, and another network domain, e.g. 101b may contain transport nodes and/or e.g. be part of a core network.

Further, the communication network 100 may comprise one or more management nodes, e.g. a first management node 130 and a second management node 131, e.g. SDN management or SDC controller (SDNc) nodes. The first management node 130 may e.g. be associated with the first network domain 101a and be communicatively connected to nodes thereof, e.g. the transmitting and/or receiving nodes 120-123. The second management node 131 may e.g. be associated with the second network domain 101b and be communicatively connected to nodes thereof, e.g. the transmitting and/or receiving nodes 124-127. The one or more management nodes may e.g. maintain one or more topology databases, e.g. one each, based on information received from the transmitting and/or receiving nodes 120-127.

Moreover, the communication network 100 may comprise a security administrating node 150 that e.g. can be associated with to an authority and/or correspond to a server, such as a Certificate Authority (CA) server. Note that the security administrating node 150 alternatively may be located remotely, e.g. outside the communication network 100, but be communicatively connected to the communication network 100 and nodes thereof. The security administrating node 150 is in the figure indicated by dotted arrows to be communicatively connected to only three nodes just not to obscure the figure too much, however, the security administrating node 150 may be communicatively connected to and thereby accessible by all the nodes.

Attention is drawn to that FIG. 1 is only schematic and for exemplifying purpose and that not everything shown in the figure may be required for all embodiments herein, as should be evident to the skilled person. Also, a communication network that corresponds to the communication network 100 will in practise typically comprise several further network nodes, as realized by the skilled person, but which are not shown herein for the sake of simplifying.

Figure 2:
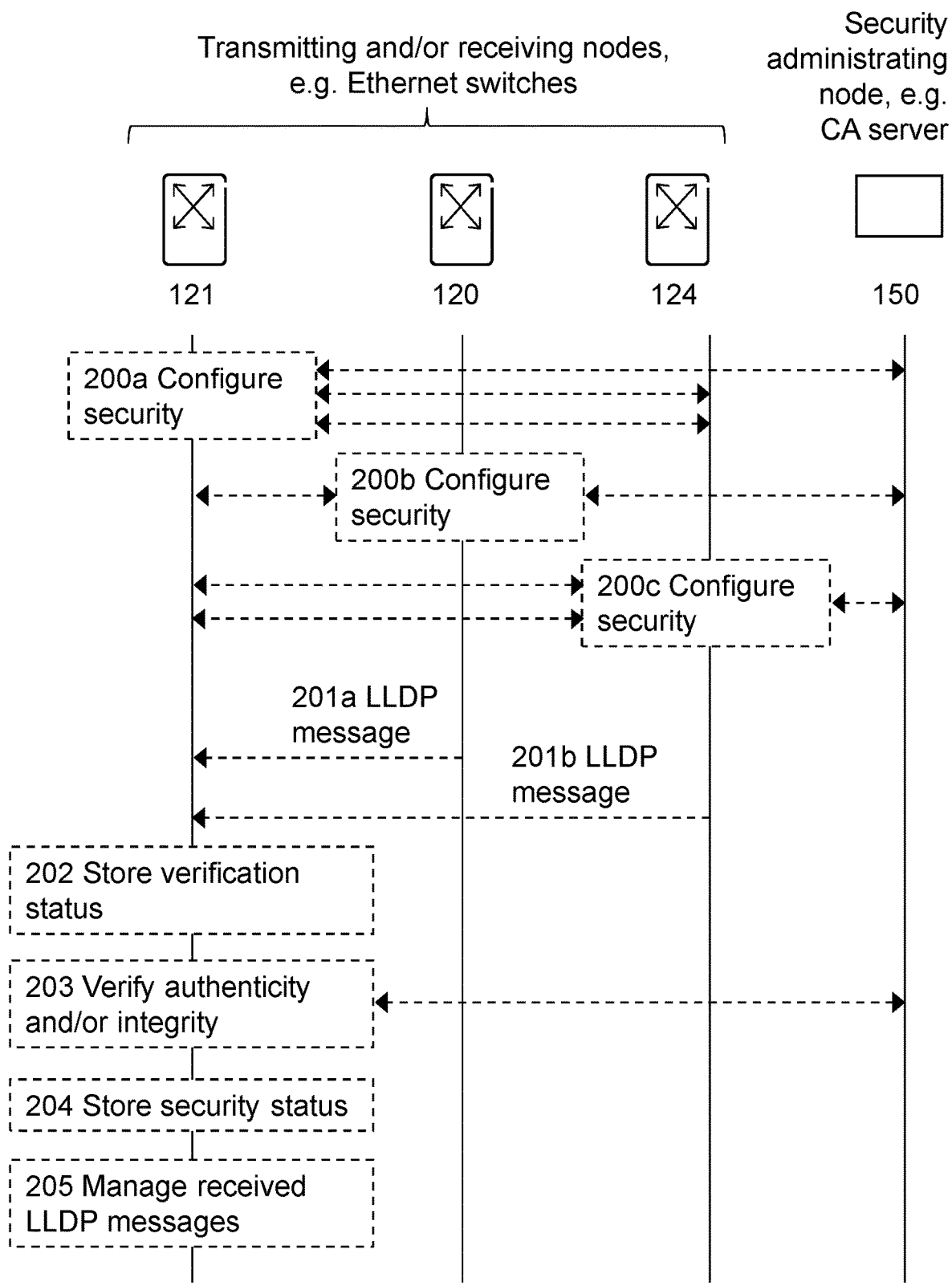
FIG. 2 is a combined signaling diagram and flowchart for describing a solution for handling LLDP messages in a communication network.

FIG. 2 depicts a first combined signaling diagram and flowchart, which will be used to exemplify and discuss some examples herein. Two transmitting nodes 120 and 124 and a receiving node 121 have been selected as examples of the transmitting and/or receiving nodes 120-127.

The actions below may be taken in any suitable order and/or be carried out fully or partly overlapping in time when this is possible and suitable.

Actions 200*a-c*

One or more of the transmitting and/or receiving nodes 120, 121, 124 may be (pre-)configured and/or (pre-)installed) with a security configuration e.g. comprising certain security settings and/or data. This may be done before or at installation of the respective node in the communication network 100 and/or at some later point in time and it may be performed at least partly manually and/or by means of some secure access to the nodes. Said configuration for a node, e.g. the transmitting node 120 or the receiving node 121, may be regarding to the whole node or for one or more communication ports thereof, i.e. may per on a per port level instead of for the whole node. If it is for the whole node, i.e. per node basis, the same applies for all relevant communication ports thereof. Hence, the configuration of a node may configure this node and/or communication ports thereof so it and/or the ports become able and/or is supported to handle security related information (see below) in LLDP messages and act as transmitting and/or receiving node according to examples herein. The security configuration for a node may e.g. comprise one or more of the following:

Information on if the node and/or which ports of the node shall be enabled for authentication and/or integrity check, i.e. verification.

One or more cryptography keys.

Information on if the node as a whole and/or which ports of the node shall apply a certain security policy or not, e.g. may each port be configured with no and/or a predefined security policy to be applied. For example, if a first security policy that is stricter than another second security policy is to be applied, and/or if the node and/or which ports of the node shall apply said second security policy, and/or if the node and/or which ports of the node shall apply no particular security policy and thus e.g. act as a conventional node and/or port in this regard. There may thus be a security policy setting configured on a per port and/or per node level. A certain, e.g. strict, security policy, may mean that processing of unauthenticated messages is disabled. Note that in some cases a security setting may be configured per node, e.g. with regard to encrypted content, while at the same time there is security settings per port.

Information on which parts, typically Type Length Values (TLVs) of the LLDP message that relate to encrypted content, that shall or should be encrypted and/or will contain encrypted content.

Information on which parts, typically TLV(s), of the LLDP message that shall or may be in clear text and thus not encrypted. Any mandatory parts, e.g. TLVs, that need to be in cleartext (not encrypted) shall be indicated as cleartext or they may be predetermined to be in cleartext.

Information on communication credentials regarding one or more security administrating nodes, e.g. the security administrating node 150.

Information specifying or indicating security algorithms to be used, e.g. Digital Signature Algorithm (DSA), Elliptic Curve DSA (ECDSA), Secure Hash Algorithm 2 (SHA2), etc.

Said one or more cryptography keys may comprise one or more of the following:

A first cryptography key, typically a public key, issued by a trusted source, e.g. the security administrating node 150 that may correspond to a Certificate Authority (CA).

A second cryptographic key, typically a public key, issued by the node and preferably signed by the trusted source. This signed public key may correspond to and/or be comprised in a so called certificate issued by a CA, e.g. the security administrating node 150.

One or more local copies of one or more third cryptography keys, typically public keys, issued by one or more neighbouring nodes to the node in question.

One or more cryptographic keys for the encryption and/or decryption of encrypted content. However, in some examples the keys for encryption of encrypted content may correspond to said third cryptographic keys and the key for decryption of encrypted content may be a private key of the receiving node.

The above-mentioned TLVs, security related information, security policies, encrypted content, keys and how they may be used with and relate to examples herein are explained below.

Actions 201*a-b*

The transmitting node 120 and the transmitting node 124 may transmit LLDP messages, respectively, to a receiving node, here the receiving node 121, of the communication network 100. More particularly, as should be realized, the communication takes part between two communication ports of the involved nodes, respectively. The LLDP messages may be sent at different points in time. The LLDP messages sent in actions 201*a-b* comprise security related information enabling to verify authenticity of the transmitting node that transmitted it and/or integrity of the message. For example, the LLDP message transmitted in action 201*a* comprises security related information that, preferably by means of encryption, enables to verify authenticity of the transmitting node 120 and/or integrity of the message. The authenticity of the transmitting node 120 may be regarding the involved communication port, i.e. the communication port that transmitted the message. In other words, the authenticity of the transmitting node 120 may be at least regarding the communication port that transmitted the LLDP message.

In general, a receiving node, e.g. the receiving node 121, or more particularly one or more communication ports thereof, may receive multiple LLDP messages from different nodes and/or ports, but not all may contain security related information. The receiving node 121 may thus receive one or more LLDP messages where at least one, e.g. as in action 201*a* and/or action 201*b*, contain security related information as disclosed herein.

The security related information may comprise encrypted information that enables to verify said authenticity.

Said encryption, by means of which the security related information may enable to verify said authenticity, may be accomplished, i.e. said encrypted information may be encrypted, by one or more of the following:

A private cryptographic key of the security administrating node 150.
A private cryptographic key of the transmitting node 120.
A public cryptographic key of the receiving node 121.
A cryptographic key that is shared between the transmitting node 120 and the receiving node 121.

Moreover, the encryption, by means of which the security related information may enable to verify said authenticity, i.e. said encrypted information, may relate to, and/or comprise, a cryptographically signed, and/or encrypted, identifier of the transmitting node 120. The identifier may be regarding the transmitting node 120 as a whole and/or a communication port thereof that transmitted the LLDP message.

Further, the security related content may further comprises a cryptographically signed and/or encrypted integrity check value, e.g. a hash sum, regarding the LLDP message.

In other words, the encryption, by means of which the security related information may enables to verify the authenticity and/or the integrity of the LLDP message, may correspond to certain encrypted information comprised in the security related information and that may be encrypted by said one or more keys.

The LLDP message may be transmitted based on security status or similar stored by the transmitting node 120, e.g. in its MIB, regarding the receiving node 121. For example, the LLDP message comprising the security related information may be transmitted based on that the security status, e.g. the MIB, indicates that the receiving node 121, e.g. the involved communication port thereof, supports security related information, else another conventional LLDP message may be transmitted instead.

By introducing the security related information in LLDP messages as in the present action and in examples herein, drawbacks as indicated above for prior art methods can be avoided while still node and/or communication port authentication and/or message integrity can be accomplished. More flexible and efficient security is provided where node and/or port authentication and message integrity can be accomplished with less impact on performance and energy consumption. For example, it can be avoided unnecessary processing and overhead resulting from using the prior art methods. Thereby unnecessary energy consumption and/or reduced performance can be avoided. Hence, e.g. LLDP topology discovery procedures relating to infrastructure of the communication network 100 are facilitated and can be accomplished securely and more efficiently than conventionally.

As understood from the above, the LLDP message(s) may advantageously be transmitted in association with a topology discovery procedure regarding the communication network 100. The topology discovery procedure may relate to SDN infrastructure. Further, the topology discovery procedure may be initiated by receipt of the transmitted LLDP message by the receiving node 121 and/or may be initiated by a management node, e.g. the management node 130, that may be managing, such as controlling, the topology discovery procedure.

The security related information of a LLDP message is advantageously comprised in one or more security related TLVs) TLVs which security related TLVs are certain TLVs of the LLDP message assigned to contain the security related information, and/or the transmitting node 120 and/or the receiving node 121 may be configured to use said TLVs for the security related information.

These TLVs may correspond to one or more of so called organizationally specific TLVs supported by conventional existing LLDP messages, which have been assigned to contain the security related information. An advantage with using such TLVs is thus that there is backwards compatibility and that implementation in existing systems is facilitated.

The following TLV categories are specified in the LLDP standard of today (see 802.1AB-2009):
  mandatory TLVs
  Basic management TLVs
  IEEE 802.1 Organizationally Specific TLVs
  IEEE 802.3 Organizationally Specific TLV set
  Vendor-defined Organizationally Specific TLVs In some examples, the LLDP message further comprises encrypted content, e.g. an encrypted content TLV. The encrypted content contains encrypted one or one or more TLVs being cleartext TLVs that have been encrypted. Further, the encrypted content TLV may be a TLV of the LLDP message assigned to contain encrypted content and/or that the transmitting node 120 and/or the receiving node is configured to use and/or process as containing encrypted content, i.e. encrypted data content. This way the LLDPs can be used to carry also encrypted content in a very flexible way that is compatible with existing functionality for handling LLDP messages. For example, a legacy or conventional node that receive a LLDP message with an encrypted content TLV may see it as a normal TLV with some content and can handle it accordingly. Only a node that supports encrypted content TLVs may identify it as such and may also have ability to decrypt the encrypted one or one or more TLVs contained in the encrypted content TLV.

Use of encrypted content may for security reasons be allowed, or be considered, only if the node and/or port transmitting the LLDP message first is verified to be authentic.

Any mandatory TLV, such as the mandatory TLVs mentioned above, part of the LLDP message, should of course be unencrypted, but any other TLV may be encrypted and e.g. part of an encrypted TLV set. During encryption, the transmitting node 120 may insert the encrypted TLV-set into a 'Encrypted-Content Container' TLV that corresponds to said encrypted content TLV. The receiving node 121 may then process the Encrypted-Content Container TLV as a set of embedded TLVs and after decryption process them as cleartext TLVs.

One or more cryptographic keys for encrypting/decrypting the encrypted content, e.g. one or one or more encrypted TLVs may be preconfigured such as in actions 200*a-c*, and/or may be provided by other means, e.g. result from actions on higher levels, e.g. by a management node, e.g. the first management node 130, or by applications involved. However, it is also possible that e.g. a public key of a key pair associated with the receiving node may be used by the transmitting node 120 for encryption and a private key of the keypair may be used by the receiving node 121 for decryption. Hence, the encryption used for the encrypted content may be symmetric, e.g. using a pre-shared and/or pre-configured key or be asymmetric, e.g. using a public key.

When the encrypted content TLV has been decrypted, the result may thus be one or more TLVs that no longer are encrypted and thus again are in cleartext and thereby can be handled as TLVs conventionally are handled.

It is typically on a use-case or case by case basis which information may be sent by LLDP without security risk and which information that needs to be secure at some level, e.g. encrypted and/or only be communicated via authentic nodes and/or ports. Examples herein e.g. make it possible to send topology details in encrypted format without the risk of sharing confidential topology information with unauthorized peers.

Action 202

The receiving node 121 may store, based on receipt of said at least one LLDP message comprising security related information, a verification status regarding the transmitting node, e.g. the transmitting node 120, that transmitted this LLDP message. The verification status indicating if said verification of authenticity is not yet performed, e.g. that it cannot yet be verified or is not yet verified. The verification status may be temporarily stored.

Hence, there may be a verification status regarding the transmitting node 120 that indicates if the transmitting node 120 and/or transmitting port thereof cannot be or has not yet been verified although a LLDP message with security related information has been received from it. The verification status is preferably temporarily stored and not e.g. part of a MIB. There may be some delay, e.g. in case verification must involve one or more other nodes, e.g. the security administrating node 150, until verification can be done or finalized based on a received LLDP message with security related information. Being able to set the verification status reflecting this makes it possible to continue and handle the node in question in a more efficient and still secure way until verification can and/or has been accomplished. The "not yet verified" may be a default verification status for all neighboring nodes of the receiving node 121 until a LLDP message with security related information has been received and/or verification (see below) of this LLDP message has been performed.

Action 203

The receiving node 121 may, following actions 201 and/or 202, based on the security related information of each received LLDP message, verify:

the authenticity of the transmitting node, regarding at least a communication port thereof, that transmitted the LLDP message with the security related information, and/or the integrity of the received LLDP message with the security related information, e.g. the integrity of the LLDP message transmitted by the transmitting node 120 in action 201*a*.

For any LLDP message received without security related information, the receiving node 121 may skip the verification in the present action, or still attempt it. The result may be that verification fails or is considered to have failed regarding these messages and/or nodes and/or ports thereof.

The verification of authenticity may further be based on the first and/or said one or more third cryptographic keys mentioned in action 200*a*, i.e. typically a public cryptographic key of the security administrating node 150 or a public cryptographic key of the transmitting node 120. The former may be used in case the encrypted information of the security related information, such as signed identifier of the transmitting node 120, has been accomplished by a private cryptographic key of the security administrating node 150. The latter may be used in case the encrypted information of the security related information, such as signed identifier of the transmitting node 120, has been accomplished by a private cryptographic key of the transmitting node 120.

In case the receiving node 121 is configured with the private cryptographic key of the transmitting node 120 in action 200*a*, it can be avoided to involve the security administrating node 150, but this would typically require that the receiving node 121 in action 200*a* is configured in advance with, preferably all, relevant public keys of neighbouring nodes.

Action 204

Further, the receiving node 121 may store, based on the verification in action 203, security status regarding one or more transmitting nodes, e.g. regarding communication ports thereof, that it has received LLDP messages from. The security status is typically stored in an information record, such as a MIB, associated with and typically managed by the receiving node 121. The stored security status may be accomplished by, e.g. an existing MIB table may be extended with, one or more status flags, such as an authentication flag, for example in a new field added to a conventional MIB.

The receiving node 121 may e.g. have received LLDP messages with security related information, respectively, from the transmitting nodes 120 and 124, and it may also (not shown) have received one or more LLDP messages from other nodes but without security related information, e.g. because these nodes, and/or communication ports involved, do not support examples herein and/or or were configured not to transmit security related information as in examples herein.

The security status information regarding a transmitting node and/or communication port thereof, e.g. the transmitting node 120 or 124, may indicate if the transmitting node, e.g. port thereof, has been verified to be authentic, and/or if the transmitting node, e.g. port thereof, has been verified to be not authentic. For example, for transmitting node 120 it may indicate that the node has been verified to be authentic while it for transmitting node 124 may indicate that the node has been verified to be not authentic. The security status information regarding a transmitting node and/or communication port thereof may also indicate whether or not the transmitting node and/or communication port supports security related content.

From the stored security status of the receiving node 121 or a communication port thereof, it may thus be possible to be informed about security status of nodes and/or communication ports that the receiving node 121 has received LLDP messages from, typically all its neighboring nodes, and if these nodes have passed authenticity verification or not, and/or if they support security related information. The security status of a transmitting node or communication port may be based on the latest received LLDP message from that transmitting node or communication port. The security status is typically stored, e.g. in a MIB; together with node and/or identifiers and/or cryptographic keys, e.g. public keys, associated with the nodes and/or ports, respectively. A public key may correspond to such an identifier, as already mentioned.

Any LLDP message that does not contain security related information may be associated with a security status corresponding to that the transmitting node, or communication port thereof, has not, at least not yet, been verified to be authentic.

In some examples, storing the security status is based on if the receiving node 121 that received the LLDP message is configured, e.g. in action 200a, to apply a certain first security policy instead of another, second security policy. Both security policies should be supported and/or be selectable for the receiving node 121. The first security policy may thus be selectable by configuration and may be stricter than the second security policy. The first or second security policy may alternatively or additionally be a default and/or implicit security policy that applies if there is not any explicitly configured security policy.

As a result, a node and/or port that applies a certain security policy, e.g. the first security policy, may store information, such as security status and identifiers, e.g. in its MIB, only regarding nodes and/or ports that are verified as authentic. If on the other hand the receiving node 121 and/or port applies said second and e.g. a less strict security policy, it may be stored security status regarding both authenticated and unauthenticated nodes and/or ports.

An advantage of storing the security status in e.g. an information record such as a MIB, is that the information then can be used for managing further communication to and/or from the node in question, and it can also be used to report status of e.g. all neighboring nodes of the receiving node 121 to e.g. one or more managing or controlling nodes of the receiving node 121, such as to the first management node 130. Said one or more management nodes can then e.g. use the information for topology discovery and/or to take actions to (re)configure the nodes, such as improving security.

Further, the stored security status enables improved security and e.g. mitigate the risk of so called distributed Denial of Service (dDoS) attacks by clearing or removing 'unauthenticated' peers, i.e. nodes or ports, and related information from the table, or to enable actions regarding network planning in the communication network 100 so that unauthenticated nodes or ports can change and be verified as authentic.

Action 205

The receiving node 121 may, based on said verification in action 203, manage said one or more received LLDP messages, e.g. as received in actions 201a-b, whereby a received LLDP message is:

discarded, i.e. not used, if the received LLDP message was verified to be not identical with the transmitted LLDP message, or discarded if the transmitting node that transmitted the LLDP message was verified to be not authentic, or further processed if the received LLDP message was verified to be identical with the transmitted LLDP message and/or if the transmitting node that transmitted the transmitted message was verified to be authentic.

As should be understood, further processed here means further used, e.g. that other content than the security related information is used by the receiving node and/or passed on to another node and/or layer. Using the information may result in updating of the information record, e.g. the MIB, also regarding other information than security status.

In some examples, the received LLDP message is managed also based on if the receiving node 121 that received the LLDP message is configured, e.g. in action 200a, to apply a certain first security policy instead of another, second security policy. These security policies may be the same as discussed above for action 204.

The first security policy may thus be selectable by configuration and may be stricter than the second security policy. The security policy may also be selectable by configuration, or may be a default and/or implicit security policy that applies without any explicitly configured security policy.

The receiving node 121 may in this action, e.g. when the verification and/or settings result in that the received LLDP message shall be further processed, check whether information in the LLDP message is already known or if it is new, e.g. information about the transmitting node 120. If the information is new the receiving node 121 may e.g. initiate communication towards the management node 130, e.g. a SDN controller (SDNc), to inform it about the new information, e.g. new topology information. One way to accomplish this may be that the receiving node initiate communication towards the management node 130 so that the management node 130 gets informed about the information record, e.g. MIB, when there is a change in the information record, e.g. regarding security status of a node, which change may have been caused by a received LLDP message.

Another way the receiving node 121, in practise any device, e.g. Ethernet switch, that implements the receiving node 121, may utilize the security status (typically comprised in the MIB) regarding neighbouring nodes, is for making switching decisions, i.e. for deciding how data packets communicated in the communication network 100 shall be switched or routed. In other words, switching decisions may be based on the security status. This may be accomplished by a certain entity comprised in the receiving node 121, such as a so called Spanning Tree Protocol entity in the receiving node 121, e.g. when it is a switch. Such entity may factorize the state of security, e.g. based on the security status, regarding neighbouring nodes when loop-free switching paths are computed to various destinations and/or addresses, typically Media Access Control (MAC) addresses.

As should be recognized by the skilled person, by "verifying authenticity of a node" is herein meant the action of verifying whether the node or at least a communication port thereof is authentic or not. If it is not authentic it may be a malicious node and/or a node that is not authorized, not trustworthy and/or not allowed to be part of the communication network 100 and should therefore not be trusted and/or not used and/or be subject to some change actions, e.g. an update or replacement.

As should be recognized by the skilled person, by "verifying integrity of a message" is herein meant verifying whether or not the message is identical with the transmitted message, i.e. is the same message, or not. In other words, to verify if the message being subject to the verification is the message that was actually transmitted or if it is not. If the message is not the message that was actually transmitted it may have been replaced by a malicious message, e.g. as part of an attempt of unauthorized access in the communication network 100 and/or to cause harm.

As should be recognized by the skilled person, "security related information enabling to verify authenticity of the transmitting node and/or integrity of the message" may e.g. comprise an identity, i.e. node identifier or node id, and a (cryptographic) key of the transmitting node 120, and an Integrity Check Value (ICV), typically a hash sum, regarding the message.

The identity and key may advantageously be combined, e.g. may be a node identifier of the transmitting node 120, which node identifier may comprise or correspond to a cryptographic key of the transmitting node 120 and may be comprised in a so called certificate associated with and typically installed on the transmitting node 120. The cryptographic key is advantageously a key as used in asymmetric encryption using a key pair, typically a public key and a private key. The private key is not to be distributed and instead e.g. kept on the node that generated the key pair, i.e. the private key corresponds to a secret key. The public key is instead for use outside the node that generated the key pair. Information that have been encrypted using one of the keys of the key pair can typically only be decrypted using the other key of the key pair, and vice versa. The encryption is advantageously based on a so called Public Key Infrastructure (PKI), i.e. based on asymmetrical encryption algorithms, although symmetric algorithms using shared keys also may be used. The nodes applying examples herein may thus have a private-public key pairs, respectively, e.g. generated by any asymmetric algorithm as defined by Federal Information Processing Standards (FIPS) 186 Version 4. The nodes applying examples herein may further be associated with certificates, respectively, each certificate comprising a public key and a node identifier of the associated node and which typically are the same.

The node identifier, typically comprised in a certificate, is advantageously signed e.g. by a trusted source, such as the security administrating node 150 that, as mentioned above, may correspond to an authority and/or server, e.g. a Certificate Authority (CA) that have issued said certificate.

The skilled person should understand that a piece of information, e.g. an identifier, being "signed" in the context of the present application typically refers to encoding, or encrypting, information associated with or corresponding to this piece of information, e.g. using an encryption key of a sender and/or originator of the piece of information, so that a receiver of the piece of information can decode or decrypt the information and thereby verify that the piece of information actually was sent from and/or originated from said sender and/or originator. Typically, this is accomplished by signing, i.e. encoding or encrypting, using the private key of a key pair, and decoding or decrypting using the public key of the key pair.

For example, the node identifier of the transmitting node 120, e.g. being comprised in the certificate, may be signed by a private key of the trusted source, e.g. security administrating node 150 that may have issued the certificate that the node identifier is part of. However, in some examples, the node identifier of the transmitting node 120 may be signed by a private key of the transmitting node 120. The latter is advantageous in that it does not require involvement of another, e.g. external, node such as the security administrating node 150, but may instead require that the corresponding public key of the transmitting node is available to the receiving node, e.g. that the receiving node has been configured with it previously. It may also require that the involved nodes, e.g. the transmitting node 10 and the receiving node 121, are in the same network domain, e.g. in the network domain 101a, and that this domain is considered sufficiently secure and/or controlled. If the involved nodes are in different network domains, e.g. when they are border nodes, e.g. as in the case of nodes 121 and 124 in FIG. 1, then the security administrating node 150 or similar may need to be involved.

The integrity check value is preferably a hash sum resulting from hashing the LLDP message (preferably the whole message both a mandatory and any optional part) with a hash algorithm, e.g. FIPS140 version 2. The integrity check value is advantageously signed, e.g. encoded or encrypted, by the private key of the transmitting node 120, whereby the receiving node can use the public key of the transmitting node to verify that the integrity check value in fact has been generated by the transmitting node and then perform e.g. hashing and compare with the received hash value to verify integrity of the message.

To sum up, the security related information may comprise one or more of:

An authentication part, e.g. a certain first TLV, comprising a node identifier of the transmitting node 120 and/or a cryptographic key associated with the transmitting node 120, which key may be a public key of a key pair associated with and/or generated by the transmitting node 120. The key may correspond to the second cryptographic key mentioned in actions 200a-c above. The authentication part is preferably signed, such as encoded or encrypted, by a trusted source. It may be signed using another cryptographic key, typically a private of the signing node, which key may correspond to the first cryptographic key mentioned in actions 200a-c above. The trusted source may be the security administrating node 150 and the second cryptographic key may then be a private key of the security administrating node 150, or the trusted source may be the transmitting node 120 itself.

An integrity part, e.g. another, second TLV, comprising an integrity check value, e.g. a hash sum, regarding the LLDP message. The integrity part is preferably signed, such as encoded or encrypted, by a trusted source, e.g. using yet another cryptographic key that may correspond to one or more of the third cryptography keys mentioned in actions 200a-c above. The trusted source may in this case be a private key of the transmitting node 120.

Figure 3:
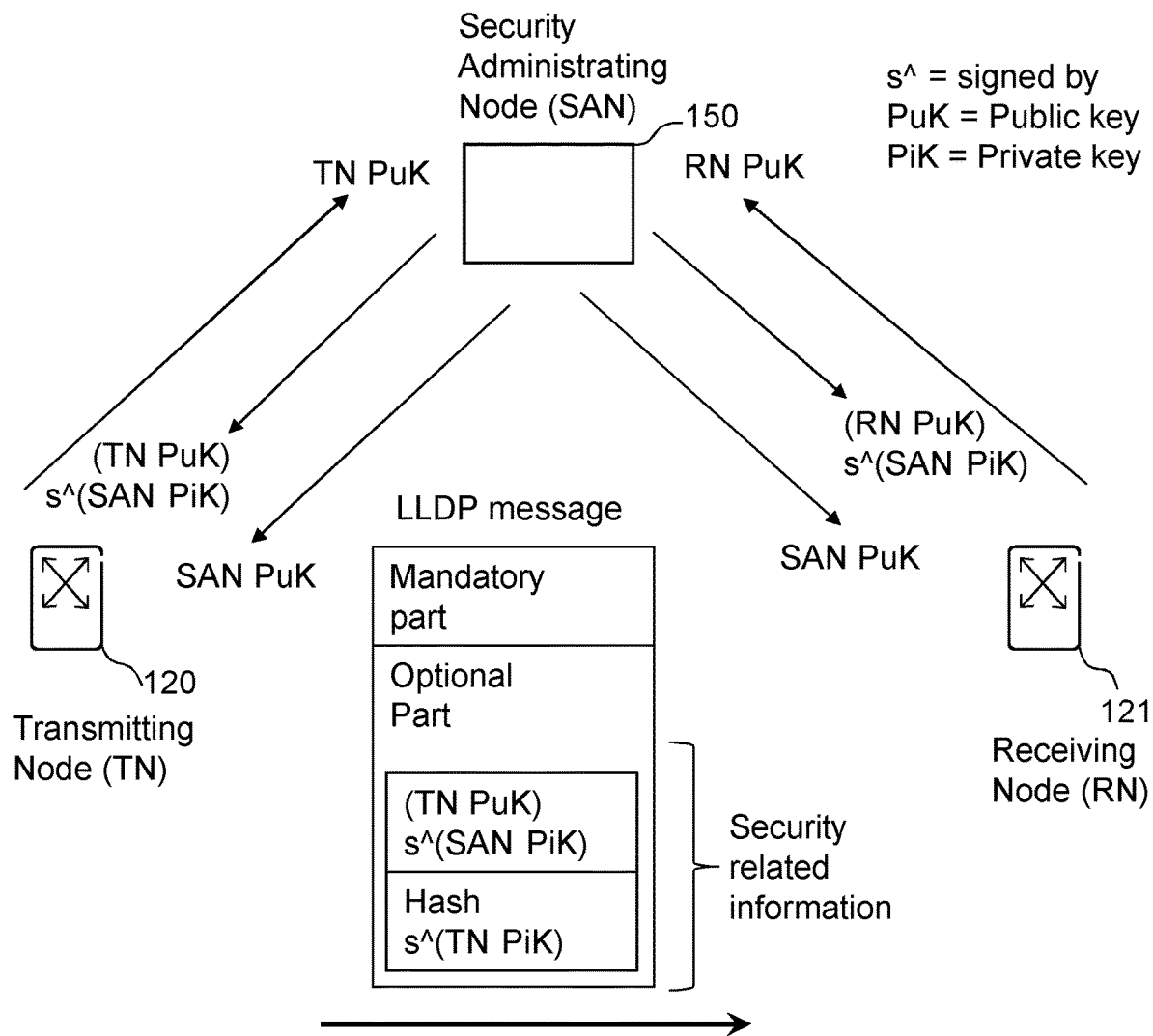
FIG. 3 is a schematic flowchart relating to an example of security related information in a LLDP message.

FIG. 3 is a schematic flowchart relating to an example of security related information in a LLDP message and of how involved nodes may exchange information to e.g. handle the security related information. In other words, FIG. 3 is a detailed example of what was discussed in the preceding paragraph. In the shown example the LLDP message is transmitted by a transmitting node abbreviated TN that may correspond to the transmitting node 120 discussed above, and received by a receiving node abbreviated RN that may correspond to the receiving node 121 discussed above. The shown LLDP message has a mandatory part and an optional part. The optional part may correspond to organizational specific TLVs. The security related information is in the shown example comprised in the optional part and enables to verify authenticity of the transmitting node and integrity of the message.

The authenticity verification is enabled by a public (cryptographic) key of the transmitting node, abbreviated TN PuK, that has been signed by a security administrating node that may correspond to the security administrating node 150 discussed above, e.g. a CA server, or more specifically by a private (cryptographic) key thereof, abbreviated SAN PiK. What here enables the authenticity verification of the transmitting node is thus what is abbreviated (TN PuK)s^(SAN PiK) in the figure, where s^ stands for "signed by".

The message integrity verification is enabled by a hash (sum) regarding e.g. the rest of the LLDP message and the hash is then signed by the transmitting node, or more specifically by a private (cryptographic) key thereof, abbreviated TN PiK. What here enables the message integrity verification authentication is thus what is abbreviated (Hash) s^(TN PiK).

Before sending the LLDP message, the transmitting node 120 thus have to obtain, e.g. be configured with and/or generate, certain information, that may involve exchanging information with the security administrating node 150, e.g. as part of node setup or installation phase and/or initial node configuration.

The transmitting node 120 may e.g. generate and/or be configured with a public key and a private key of a cryptographic key pair associated with the transmitting node 120. The public key thereof, i.e. TN PUK may be sent to the security administrating node 150 to be signed by its private key, i.e. SAN PiK, and the transmitting node 120 may thus receive back the (TN PUK)sˆ(SAN PiK). The transmitting node 120 may also from the security administrating node 150 receive its public key, i.e. SAN PuK, whereby the transmitting node 120 becomes able to verify signatures made by the security administrating node 150, e.g. verify that a signature said to be made by the security administrating node 150 is actually made by it.

It is realized that multiple nodes may be configured correspondingly as described for the transmitting node 120 above. This is illustrated in the figure for the receiving node 121. These nodes can then transmit and/or receive LLDP messages with security related information and use it for node authentication and/or message integrity verification and/or to transmit/receive encrypted content.

In the figure, the receiving node 121 receives, in the LLDP message, the TN PuK that also corresponds to an identifier of the transmitting node 120, and is able to verify its authenticity since it is signed by the security administrating node 150, i.e. (TN PuK)sˆ(SAN PiK) and the receiving node 121 has access to the public key of the security administrating node 150, i.e. SAN PuK. When having the TN PuK and that is verified authentic, the receiving node 12'1 can use it to verify that the hash is actually generated by the transmitting node 120, i.e. that the hash is authentic, and/or decrypt it. The hash can then be used by the receiving node 121 to verity the integrity of the LLDP message. In some examples, not shown here, the nodes, e.g. the transmitting node 120 and/or the receiving node 121 may also or alternatively be configured with public keys of other nodes that have been signed by a security administrating node, e.g. the transmitting node 120 may e.g. also receive the (RN PuK)sˆ(SAN PiK) from the security administrating node 150 and the receiving node 121 may also receive the (TN PuK)sˆ(SAN PiK) from the security administrating node 150. In these examples, these public keys, that thus typically correspond to identifiers of said other nodes, can be used as an extra security step to compare with the public key of the LLDP message where both public keys, obtained via two different paths, need to be the same to be verified ok. Alternatively, the public key may in this case not be needed to be sent in the LLDP message, or it can be sent but be signed or be encrypted by the transmitting node 120 using the public key of the receiving node 121 instead.

When a node, e.g. the receiving node 121, has the public key of another node, e.g. the transmitting node 120, it can use it to e.g. encrypt content to be sent to this node in a next step, e.g. to accomplish encrypted content in a LLDP message as discussed above.

Figure 4:
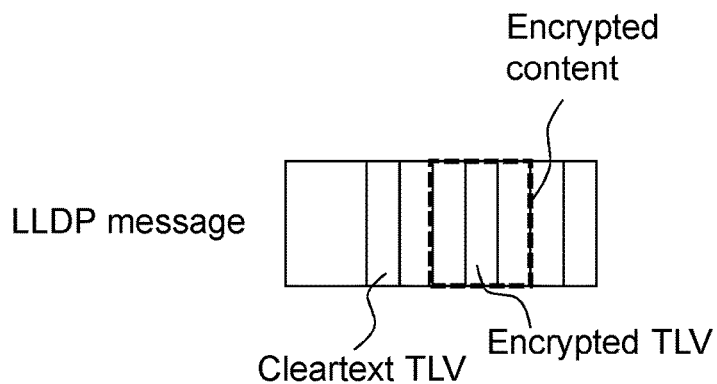
FIG. 4 is a schematic block diagram to illustrate encrypted content in a LLDP message.

FIG. 4 is a schematic block diagram to illustrate encrypted content in a LLDP message as discussed above in connection with FIG. 2. A certain TLV of a conventional LLDP message may be assigned to be or act as a container of encrypted content. The transmitting and receiving node "know" this, e.g. may be configured so that the TLV with encrypted content is identified and can be managed accordingly. The content of this TLV may be one or more TLVs in cleartext that have been encrypted and thus have become one or more encrypted TLVs.

The solutions and examples discussed above in relation to FIGS. 2-4 are advantageous used with embodiments herein as will be described next. However, also solutions based on the prior art security protocols mentioned in the Background can be used to accomplish security regarding e.g. authentication and message integrity, and then be used with embodiments herein, although these protocols may result in undesired side effects in some situations as mentioned above, e.g. regarding unnecessary processing and overhead and thereby unnecessary energy consumption and/or reduced performance, but that can be avoided by the solution discussed above in relation to FIGS. 2-4.

Figure 5:
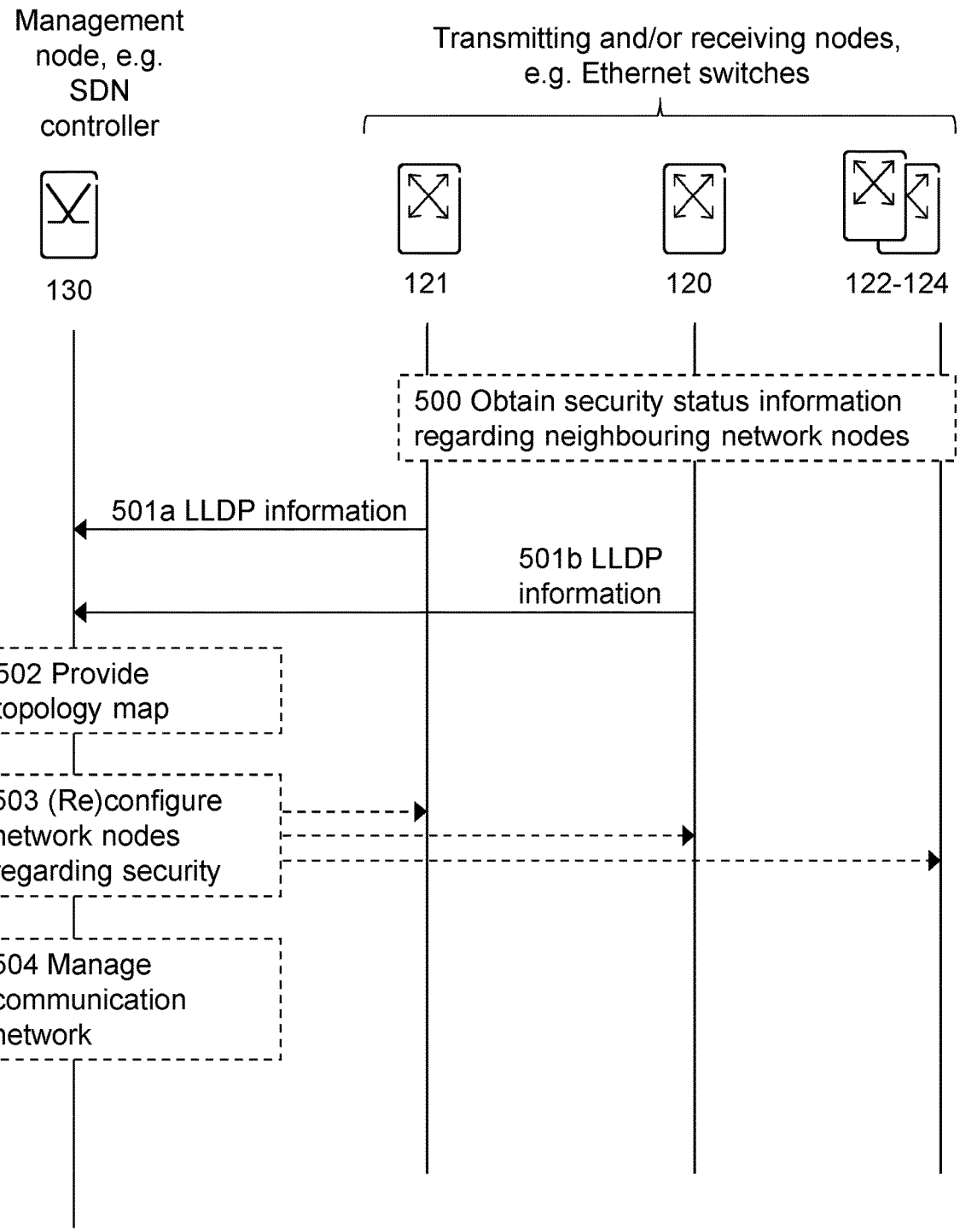
FIG. 5 is a combined signaling diagram and flowchart for describing embodiments herein.

FIG. 5 depicts another combined signaling diagram and flowchart, which will be used to exemplify and discuss some embodiments herein. The transmitting and/or receiving nodes 120-124 have been selected as examples of network nodes in the communication network 100 and the first management node 130 as an example of a management node.

The actions below may be taken in any suitable order and/or be carried out fully or partly overlapping in time when this is possible and suitable.

Action 500

The nodes 120-124 may obtain security status information regarding neighbouring network nodes based on one or more LLDP messages received from the neighboring network nodes. That is, node 120 may obtain security status information regarding nodes 121 and/or 123, node 121 regarding nodes 120 and/or 124, node 122 regarding nodes 120 and/or 123, node 123 regarding nodes 120 and/or 122, and node 124 regarding nodes 121 and/or 125 and/or 126. The security status information regarding a neighbouring node may correspond to the security status discussed above. Each node may thus store, e.g. in its MIB, security status about its neighbouring nodes, e.g. regarding one or more communication ports thereof, typically such that the node has received LLDP messages from. The security status regarding a neighbouring node, such as stored by the node 121 regarding the node 120, may be regarding one or more communication ports thereof, and may indicate if the neighbouring network node, e.g. the node 120 or communication port(s) thereof, has been verified to be authentic and/or if it has been verified to be not authentic.

Note that it may be predefined and/or predetermined that if a node is not indicated as verified to be authentic, this is to be seen as an indication of the node as verified to be not authentic, or the opposite way around. In some embodiments, for security reasons, a node that is not indicated as verified to be authentic, shall be considered and/or shall be assumed to be verified as not authentic.

Obtain may here involve receiving one or more LLDP messages from a neighbouring node and process these messages, such as verify the authenticity based on the LLDP messages or security related information thereof as discussed above. Alternatively, to obtain security status information regarding a neighbouring node may involve receiving and/or processing some other information that result in security status regarding that neighbouring node, e.g. regarding one or more communication ports thereof. A node could e.g. alternatively obtain security status based on some of the prior art methods mention in the Background and separately receive conventional LLDP messages from neighbouring nodes and then e.g. store information in its MIB based on the LLDP messages and/or based on the obtained security status information.

In any case, a node, e.g. the node 121, may store the security status information together with information obtained from one or more LLDP messages received from the same neighbouring node, e.g. node 120, or communication port(s) thereof, that the security status is valid for, e.g. store it in a database such as MIB of the node, e.g. the node 121.

Actions 501*a-b*

At least some of the nodes, e.g. nodes 120-124, that in the previous action obtained the security status information may transmit, or send, the security status information to a management node, e.g. the management node 130, that may receive or retrieve this information. Said at least some of the nodes 120-124 are in the following assumed to be the nodes 120 and 121.

In any case, the transmitted and received information may be named LLDP information, which LLDP information is information obtained, typically compiled, by said nodes, i.e. for example node 121, based on one or more LLDP messages received from neighbouring network nodes. That is, in the case of node 120, based on one or more LLDP messages received from nodes 120 and/or 124. The LLDP information thus comprises the security status information. The LLDP information may correspond to or be a MIB that may be a conventional MIB that has been extended with security status information and possibly also other information as discussed above.

The management node 130 may thus utilize security status information received with LLDP information from nodes, e.g. nodes 120-121, which security status indicates which neighbouring network nodes to said nodes that have been verified to be authentic and/or which that have been verified to be not authentic. This enables the management node 130 that to take into account whether nodes, e.g. discovered via a discovery procedure based on LLDP messages, are authenticated and/or which are not. This enables improved security in the communication network 100 and an improvement regarding how network nodes can be managed based on LLDP messages in the communication network. Conventionally, management based on LLDP messages are based on MIBs compiled based on information from LLDP messages, but there is no security status information involved as in embodiments herein.

A further advantage with embodiments herein if used with the solutions discussed above in relation to FIGS. 2-4 is that these solutions are based on security related information in LLDP messages, with facilitates providing the LLDP information, e.g. MIBs, with security status information compared to if conventional LLDP messages are received and authenticity is verified separately, i.e. not based on the LLDP messages.

Action 502

The management node 130 may then provide, e.g. generating and/or updating, a topology map regarding the communication network 100 based on the received LLDP information and the security status information. The topology map may be a conventional one e.g. as may be provided based on information from conventional MIBs, such as used for SDN, but where the security status information has been taken into account, for example may the security status of nodes been taking into account, e.g. that the topology map may be classified based on it or that certain parts of it are classified as secure or more secure than other parts, based on the security status information. Depending on a setting and/or configuration of the management node 130, the topology map may only utilize and/or be based on and/or prioritise nodes and/or ports thereof, that according to the security status information are secure, such as verified to be authentic. This makes it possible to provide a much more versatile and usable topology map, especially in situations where security is of particular importance.

Action 503

Further, the management node 130 may configure and/or reconfigure, based on the received security status information and/or the topology map, one or more of said network nodes, e.g. one or more of nodes 120-127, regarding security. For example, the management node may provide a new or updated configuration, such as discussed above, for one or more of said nodes. Alternatively or additionally the management node 130 may configure or reconfigure one or more of the nodes so they can change from being not verified authentic to become verified as authentic. For example, if the security status indicates the node 124 to be not verified authentic, the management node 130 may configure it, such as update a software and/or configure it with cryptographic keys and/or activate a stricter security policy within the node 124 so e.g. node 121 when receiving a next LLDP message from node 124 can verify it as authentic. Note that the management node 130 may (re)configure one or more of nodes, e.g. one or more of nodes 122-124, that it did not receive any LLDP information from since the LLDP information is about neighbouring nodes and e.g. node 124 is neighbouring node 121. Also, the management node 130 may even (re)configure node(s) not identified by the LLDP information since such node(s), e.g. one or more of nodes 125-127, may still be identified by the topology map or be known in some other way by the management node 130. When such node(s) are not identified by the LLDP information, the management node 130 may as a result e.g. attempt to (re)configure the node(s) to become identifiable and/or be identified next by LLDP information and/or to transmit LLDP messages with security related information, or the management node 130 may attempt to switch such node(s) off if it e.g. can be assumed that such node(s) is not secure.

Hence, to configure and/or reconfigure said one or more of the network nodes, e.g. nodes 120-127, may comprise to change configuration of one or more of the network nodes, e.g. node 124, so they, or it, will communicate using LLDP messages, respectively, that comprises security related information, e.g. as discussed above. That is, security related information enabling to verify authenticity of the node, e.g. communication port(s) thereof, transmitting such LLDP message and/or enabling to verify integrity of such LLDP message. For example, so that node 124 will transmit LLDP messages with security related information that enables, e.g. node 121, to verify authenticity the node 124.

In other words, to configure and/or reconfigure said one or more of the network nodes may comprises to configure one or more of the network nodes, e.g. node 124, with security related elements required to accomplish said security related information. The security related element may e.g. be one or more of the cryptographic keys as mentioned above or other elements that may be associated with, e.g. referenced by, the configuration of a node as discussed above.

Moreover, to configure and/or reconfigure said one or more of the network nodes, e.g. nodes 120-127, may comprise to configure at least one of said network nodes, e.g. node 124 or all of the nodes, to communicate using LLDP messages with encrypted content, e.g. as discussed above, where the encrypted content contains encrypted one or one or more TLVs being cleartext TLVs that have been encrypted.

The present action thus further improves security and enables e.g. to provide a sufficiently secure SDN even though nodes to be used in the communication network 100, e.g. according to the topology map, are not sufficiently secure to begin with.

Action 504

In general, the management node 130 may manage the communication network 100 based on the received security status information so that communication through network nodes that have been verified to be authentic will be prioritized. For example, if nodes 120-123 have been verified to be authentic, communication through these, and e.g. in the first network domain 101*a*, may be prioritized over communication through other network nodes and/or in other network domains.

Said prioritization may e.g. be accomplished through the topology map, e.g. by updating it based on (new) security information received after the topology map was provided in the above action, or just to update a routing table or similar that makes sure that communication is taking part only or prioritized through, or become possible, only through network nodes that are considers secure, e.g. that have been verified authentic according to the security status information. The present action may involve defining and/or managing and/or operating a SDN on the communication network 100. One or more of the previous actions 501-503 may be considered part of the present action or the present action may be considered relating to further management of the communication network 100.

In any case, the present action enables further improvements regarding security.

As should be recognized, "to prioritize" communication through certain network nodes over other network nodes can be accomplished in many different ways. For example, that that only prioritized nodes are allowed for communication, or that, at least first, only prioritized network nodes are considered and/or used for communication. If the prioritized nodes are sufficient to accomplish a desired or required communication, other nodes can completely be left out, else one at a time of the other nodes can be considered and used, then more of them, but thus only when there is no prioritized node to use instead, until a desired or required communication is accomplished. Another way is to first always select a prioritized node if many nodes are possible to use, e.g. when it is set forth to find a certain route or communication path in the communication network 100. If a prioritized node is not selectable or possible to find at some point, another non-prioritized node is selected, or a "step back" is performed until another prioritized node is selected and then a new attempt is made to see if it is possible to continue via another path where only or more prioritized nodes are involved, etc. In general, as should be recognized by the skilled person, to prioritize communication through certain nodes, such as through prioritized nodes, can be seen as maximising use and/or involvement of these prioritized nodes, i.e. corresponds to an optimization problem.

Figure 6:
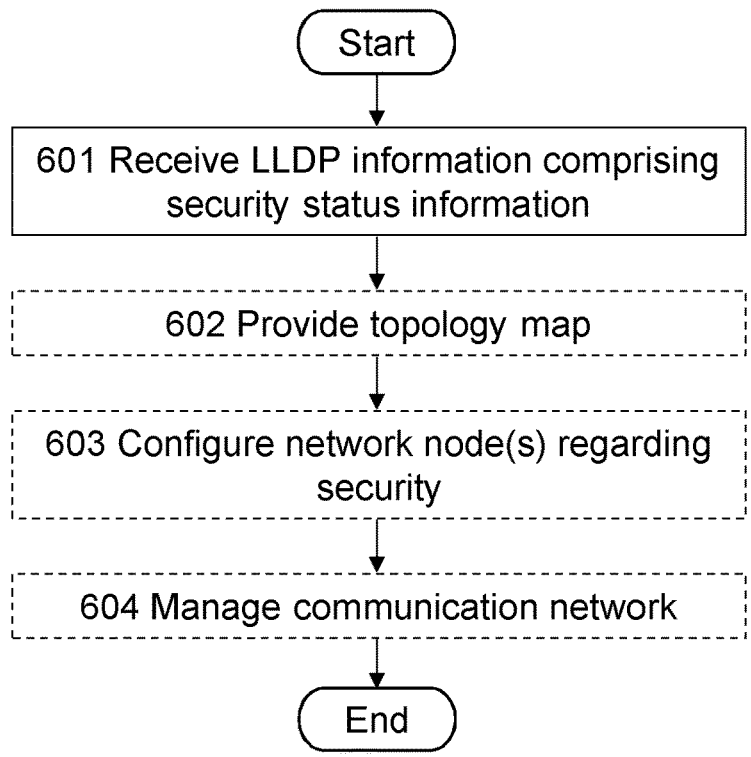
FIG. 6 is a flowchart schematically illustrating embodiments of a method performed by a management node.

FIG. 6 is a flowchart schematically illustrating embodiments of a method performed by a management node, e.g. the management node 130 or 131 although the management node 131 will be used as an example in the following. The method is for supporting management of network nodes, e.g. the transmitting and/or receiving network nodes, or simply nodes, 120-127, comprised in a communication network, e.g. the communication network 100.

The method comprises the following actions, which actions may be taken in any suitable order and/or be carried out fully or partly overlapping in time when this is possible and suitable.

Action 601

The management node 130 receives, from at least some of said network nodes, e.g. from nodes 120, 121, LLDP information, which LLDP information is information obtained by said nodes based on one or more LLDP messages received from neighboring network nodes, e.g. nodes 120-124. That is, nodes that are neighbouring said at least some network nodes. The LLDP information comprises security status information regarding said neighbouring network nodes, e.g. nodes 120-124, wherein the security status information regarding a neighbouring network node, e.g. node 120, indicates if the neighbouring network node, e.g. node 120, has been verified to be authentic and indicates if the neighbouring network node, e.g. node 120, has been verified to be not authentic.

This action may fully or partly correspond to actions 501*a-b*.

Action 602

The management node 130 may provide a topology map regarding the communication network 100 based on the received LLDP information and the security status information.

This action may fully or partly correspond to action 502.

Action 603

The management node 130 may configure, based on the received security status information and/or the topology map, one or more of said network nodes, exemplified by nodes 120-127, regarding security.

To configure may here comprise to change configuration of one or more of said network nodes, e.g. some, such as nodes 121-124, of nodes 120-127, so they will transmit LLDP messages, respectively, that comprises security related information enabling to verify authenticity of the node transmitting such LLDP message and/or enabling to verify integrity of such LLDP message.

In some embodiments, to configure may here comprise to configure one or more of said network nodes, e.g. some, such as nodes 121-124, of nodes 120-127, with security related elements required to accomplish said security related information.

Further, in some embodiments, to configure may here comprise to configure one or more of said network nodes, e.g. some, such as nodes 121-124, of nodes 120-127, to communicate using LLDP messages with encrypted content, which encrypted content contains encrypted one or one or more TLVs being cleartext TLVs that have been encrypted.

This action may fully or partly correspond to action 503.

Action 604

The management node 130 may manage at least part of the communication network 100 based on the security status information so that communication through network nodes that have been verified to be authentic will be prioritized.

This action may fully or partly correspond to action 504.

Figure 7:
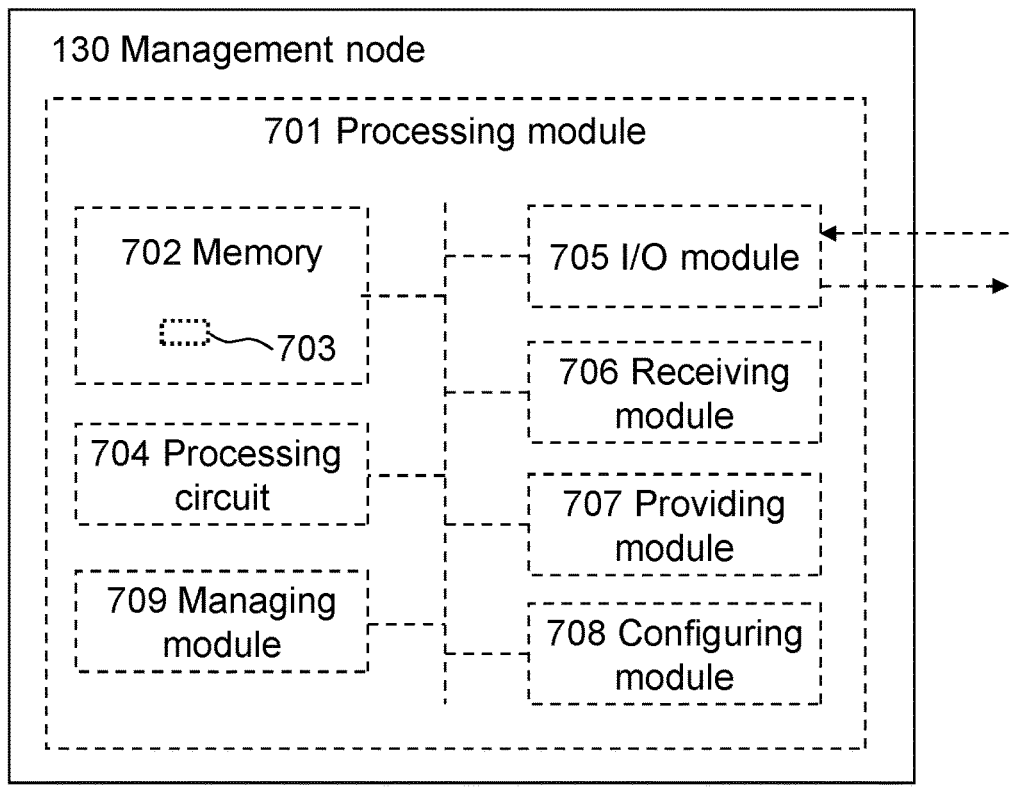
FIG. 7 is a functional block diagram for illustrating embodiments of the management node.

FIG. 7 is a schematic block diagram for illustrating embodiments of a management node, e.g. the management node 130 or 131, in the figure and in the following exemplified as the management node 130. The management node is for supporting management of network nodes, e.g. the transmitting and/or receiving network nodes, or simply nodes, 120-127, comprised in a communication network, e.g. the communication network 100.

The figure is particularly for illustrating how the management node may be configured to perform the method and actions discussed above in connection with FIG. 6.

The management node 130 may comprise a processing module 701, such as a means, one or more hardware modules, including e.g. one or more processors, and/or one or more software modules for performing said methods and/or actions.

The management node 130 may further comprise a memory 702 that may comprise, such as contain or store, a computer program 703. The computer program 703 comprises 'instructions' or 'code' directly or indirectly executable by the management node 130 so that it performs said method and/or actions. The memory 702 may comprise one or more memory units and may be further be arranged to store data, such as configurations and/or applications involved in or for performing functions and actions of embodiments herein.

Moreover, the management node 130 may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the management node 130 is operative, or configured, to perform said method and/or actions.

Typically, the management node 130, e.g. the processing module 701, comprises an Input/Output (I/O) module 705, configured to be involved in, e.g. by performing, any communication to and/or from other units and/or nodes. The I/O module 705 may be exemplified by an obtaining, e.g. receiving, module and/or a providing, e.g. sending or transmitting, module, when applicable.

In further embodiments, the management node 130, e.g. the processing module 701, may comprise one or more of a receiving module 706, a providing module 707, a configuring module 708, and a managing module 709 as exemplifying hardware and/or software module(s).

In some embodiments, the receiving module 706, the providing module 707, the configuring module 708 and the managing module 709, may be fully or partly implemented by the processing circuit 704.

Therefore, according to the various embodiments described above, the management node 130, and/or the processing module 701 and/or the processing circuit 704 and/or the receiving module 706 and/or the I/O module 705, are operative, or configured, to receive, from at least some of said network nodes, e.g. from nodes 120, 121, said LLDP information, which LLDP information is information obtained by said nodes based on one or more LLDP messages received from neighboring network nodes, e.g. nodes 120-124. That is, nodes that are neighbouring said at least some network nodes. As already discussed above in connection with FIG. 6, the LLDP information comprises security status information regarding said neighbouring network nodes, e.g. nodes 120-124, wherein the security status information regarding a neighbouring network node, e.g. node 120, indicates if the neighbouring network node, e.g. node 120, has been verified to be authentic and indicates if the neighbouring network node, e.g. node 120, has been verified to be not authentic.

Moreover, the management node 130, and/or the processing module 701 and/or the processing circuit 704 and/or the providing module 707 and/or the I/O module 705, may be operative, or configured, to provide said topology map regarding the communication network 100 based on the received LLDP information and the security status information.

Furthermore, the management node 130, and/or the processing module 701 and/or the processing circuit 704 and/or the configuring module 708 and/or the I/O module 705, may be operative, or configured, to configure, based on the received security status information and/or the topology map, said one or more of said network nodes, exemplified by nodes 120-127, regarding security.

Further, the management node 130, and/or the processing module 701 and/or the processing circuit 704 and/or the managing module 709 and/or the I/O module 705, may be operative, or configured, to manage at least part of the communication network 100 based on the security status information so that communication through network nodes that have been verified to be authentic will be prioritized.

Figure 8:
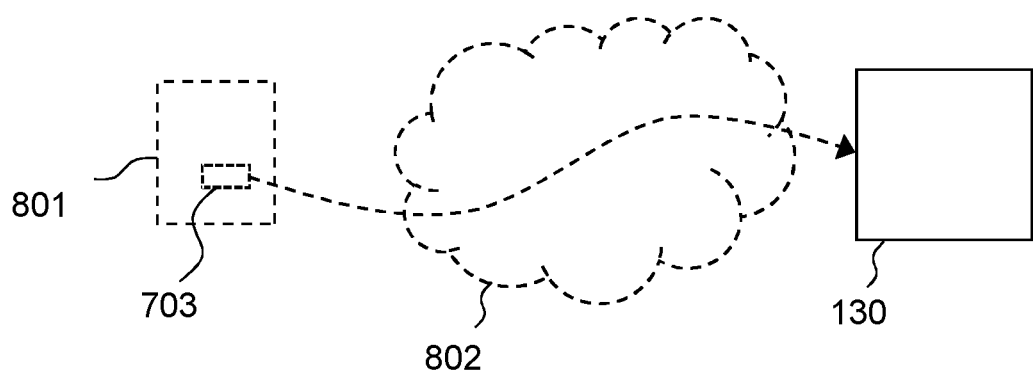
FIG. 8 is a schematic drawing illustrating embodiment relating to computer program(s) and carriers thereof to cause the transmitting node and the receiving node to perform method actions.

FIG. 8 is a schematic drawing illustrating embodiments relating to computer program(s) and carriers thereof to cause the management node discussed above, e.g. the management node 130, to perform the method actions. The computer program may be the computer program 703 and comprises instructions that when executed by the processing circuit 704 and/or the processing module 701 causes the management node, e.g. the management node 130, to perform as described above. In some embodiments there is provided a carrier, or more specifically a data carrier, e.g. a computer program product, comprising the computer program 703. The carrier may be one of an electronic signal, an optical signal, a radio signal, and a computer readable storage medium, e.g. a computer readable storage medium 801 as schematically illustrated in the figure. The computer program 703 may thus be stored on the computer readable medium 801. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 801 may be used for storing data accessible over a computer network 802, e.g. the Internet or a Local Area Network (LAN). The computer program 703 may furthermore be provided as a pure computer program or comprised in a file or files. The file or files may be stored on the computer readable storage medium 801 and e.g. available through download e.g. over the computer network 802 as indicated in the figure, e.g. via a server. The server may e.g. be a web or File Transfer Protocol (FTP) server. The file or files may e.g. be executable files for direct or indirect download to and execution on the management node 130 to make it perform as described above, e.g. by execution by the processing circuit 704. The file or files may also or alternatively be for intermediate download and compilation involving the same or another processor to make them executable before further download and execution causing the management node 130 to perform as described above.

Note that any processing module(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the management node 130 to be configured to and/or to perform the above-described method.

Identification by any identifier herein may be implicit or explicit. The identification may be unique in the communication network 100 or at least in a relevant part or area thereof.

The term "network node" or simply "node" as used herein may as such refer to any type of node that may communicate with another node in and be comprised in a communication network, e.g. the communication network 100. Such node may e.g. be a transport network node and/or e.g. an Ethernet node as mentioned above. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless device, e.g. a so called User Equipment, and/or that are connected to other network node(s) or network element(s) or any radio node from which a wireless device receives signals from. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage medium, a portable computer diskette or disc, flash memory, random access memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission.

In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a management node, for supporting management of network nodes comprised in a communication network, the method comprises:
   receiving, from at least some of said network nodes, Link Layer Discovery Protocol (LLDP) information, which LLDP information is information obtained by said at least some network nodes based on one or more LLDP messages received from neighbouring network nodes that are neighbouring said at least some network nodes, the LLDP information comprising security status information regarding said neighbouring network nodes, wherein the security status information regarding a neighbouring network node indicates if the neighbouring network node has been verified to be authentic or indicates if the neighbouring network node has been verified to be not authentic.

2. The method as claimed in claim 1, wherein the method further comprises:
   providing a topology map regarding the communication network based on the LLDP information and the security status information.

3. The method as claimed in claim 2, wherein the method further comprises:
configuring, based on the security status information, the topology map, or both the security status information and the topology map, one or more of said network nodes regarding security.

4. The method as claimed in claim 3, wherein said configuring comprises changing configuration of one or more of said network nodes so that re-configured network nodes will transmit LLDP messages, respectively, that comprises security related information enabling to verify authenticity of the node transmitting such LLDP message, enabling to verify integrity of such LLDP message, or both enabling to verify authenticity of the node transmitting such LLDP message and enabling to verify integrity of such LLDP message.

5. The method as claimed in claim 4, wherein said configuring comprises configuring one or more of said network nodes with security related elements required to accomplish said security related information.

6. The method as claimed in claim 3, wherein said configuring comprises configuring one or more of said network nodes to communicate using LLDP messages with encrypted content, which encrypted content contains encrypted one or one or more Type Length Values (TLVs) being cleartext TLVs that have been encrypted.

7. The method as claimed in claim 1, wherein the method further comprises:
managing at least part of the communication network based on the security status information so that communication through network nodes that have been verified to be authentic will be prioritized.

8. A non-transitory computer readable storage medium comprising instructions that when executed by a processing circuit of a management node, are capable of causing the management node for supporting management of network nodes of a communication network to perform operations comprising:
receiving, from at least some of said network nodes, Link Layer Discovery Protocol (LLDP) information, which LLDP information is information obtained by said at least some network nodes based on one or more LLDP messages received from neighbouring network nodes that are neighbouring said at least some network nodes, the LLDP information comprising security status information regarding said neighbouring network nodes, wherein the security status information regarding a neighbouring network node indicates if the neighbouring network node has been verified to be authentic or indicates if the neighbouring network node has been verified to be not authentic.

9. A management node for supporting management of network nodes comprised in a communication network, wherein the management node comprising:
a processor; and
a memory containing instructions which, when executed by the processor, cause the management node to perform operations to:
receive, from at least some of said network nodes Link Layer Discovery Protocol (LLDP) information, which LLDP information is information obtained by said at least some network nodes based on one or more received LLDP messages received from neighbouring network nodes that are neighbouring said at least some network nodes, the LLDP information comprising security status information regarding said neighbouring network nodes, wherein the security status information regarding a neighbouring network node indicates if the neighbouring network node has been verified to be authentic or indicates if the neighbouring network node has been verified to be not authentic.

10. The management node as claimed in claim 9, wherein the management node is further performs operations to:
provide a topology map regarding the communication network based on the LLDP information and the security status information.

11. The management node as claimed in claim 10, wherein the management node is further performs operations to:
configure, based on the security status information, the topology map, or both the security status information and the topology map, one or more of said network nodes regarding security.

12. The management node as claimed in claim 11, wherein the management node performs operations to change configuration of one or more of said network nodes so that re-configured network nodes will transmit LLDP messages, respectively, that comprises security related information enabling to verify authenticity of the node transmitting such LLDP message, enabling to verify integrity of such LLDP message, or both enabling to verify authenticity of the node transmitting such LLDP message and enabling to verify integrity of such LLDP message.

13. The management node as claimed in claim 12, wherein the management node performs operations to configure one or more of said network nodes with security related elements required to accomplish said security related information.

14. The management node as claimed in claim 11, wherein the management node to perform operations to configure one or more of said network nodes to communicate using LLDP messages with encrypted content, which encrypted content contains encrypted one or one or more Type Length Values (TLVs) being cleartext TLVs that have been encrypted.

15. The management node as claimed in claim 9, wherein the management node further performs operations to:
manage at least part of the communication network based on the security status information so that communication through network nodes that have been verified to be authentic will be prioritized.

16. The non-transitory computer readable storage medium as claimed in claim 8, wherein the instructions are capable of further causing the management node to perform operations comprising:
providing a topology map regarding the communication network based on the LLDP information and the security status information.

17. The non-transitory computer readable storage medium as claimed in claim 16, wherein the instructions are capable of further causing the management node to perform operations comprising:
configuring, based on the security status information, the topology map, or both the security status information and the topology map, one or more of said network nodes regarding security.

18. The non-transitory computer readable storage medium as claimed in claim 17, wherein said configuring comprises changing configuration of one or more of said network nodes so that re-configured network nodes will transmit LLDP messages, respectively, that comprises security related information enabling to verify authenticity of the node transmitting such LLDP message, enabling to verify integrity of such LLDP message, or both enabling to verify authenticity of the node transmitting such LLDP message and enabling to verify integrity of such LLDP message.

19. The non-transitory computer readable storage medium as claimed in claim 18, wherein said configuring comprises configuring one or more of said network nodes with security related elements required to accomplish said security related information.

20. The non-transitory computer readable storage medium as claimed in claim 17, wherein said configuring comprises configuring one or more of said network nodes to communicate using LLDP messages with encrypted content, which encrypted content contains encrypted one or one or more Type Length Values (TLVs) being cleartext TLVs that have been encrypted.

* * * * *